United States Patent [19]

Johnson

[11] 4,172,551

[45] Oct. 30, 1979

[54] LINEAR MOVE IRRIGATION SYSTEM AND CONTROL THEREFOR

[75] Inventor: Thomas M. Johnson, Elkhorn, Nebr.

[73] Assignee: Valmont Industries, Inc., Valley, Nebr.

[21] Appl. No.: 855,661

[22] Filed: Nov. 29, 1977

[51] Int. Cl.² .............................................. B05B 3/00
[52] U.S. Cl. ................................... 239/179; 239/212; 180/168
[58] Field of Search ............... 239/178, 179, 184, 189, 239/190, 212, 177; 137/344; 180/131, 79, 98

[56] References Cited

U.S. PATENT DOCUMENTS

| | | | |
|---|---|---|---|
| 3,613,703 | 10/1971 | Stout | 239/212 X |
| 3,802,627 | 4/1974 | Seckler et al. | 239/212 |
| 3,974,845 | 8/1976 | Indresaeter | 239/184 X |
| 3,979,062 | 9/1976 | Christensen et al. | 239/177 X |
| 4,099,669 | 7/1978 | Cortopassi | 239/181 X |

Primary Examiner—John J. Love
Attorney, Agent, or Firm—Rogers, Eilers & Howell

[57] ABSTRACT

A linear move irrigation system and control therefor for use in irrigating large land areas including a water conduit extending over a portion of the field and supported on a series of support towers, the entire conduit being made to move down the field to be irrigated. A control system for controlling the movement of the irrigation system along a defined path and so as to maintain the wheel tracks of the conduit support towers generally parallel to the path. The control system includes a sensor located somewhere along the water conduit for sensing when a point located forward of the conduit relative to its direction of travel, is off the defined path. The movement of outwardly located towers near opposite ends of the conduit are automatically controlled in response to predetermined displacement of the point relative to the path, said towers being preferably located at opposite ends of the conduit, so as to maintain the point over the defined path, and further to maintain the wheel tracks of the conduit support towers generally parallel as the system moves over the field. The controlled towers near opposite ends of the conduit are normally driven when the point is on the path.

39 Claims, 9 Drawing Figures

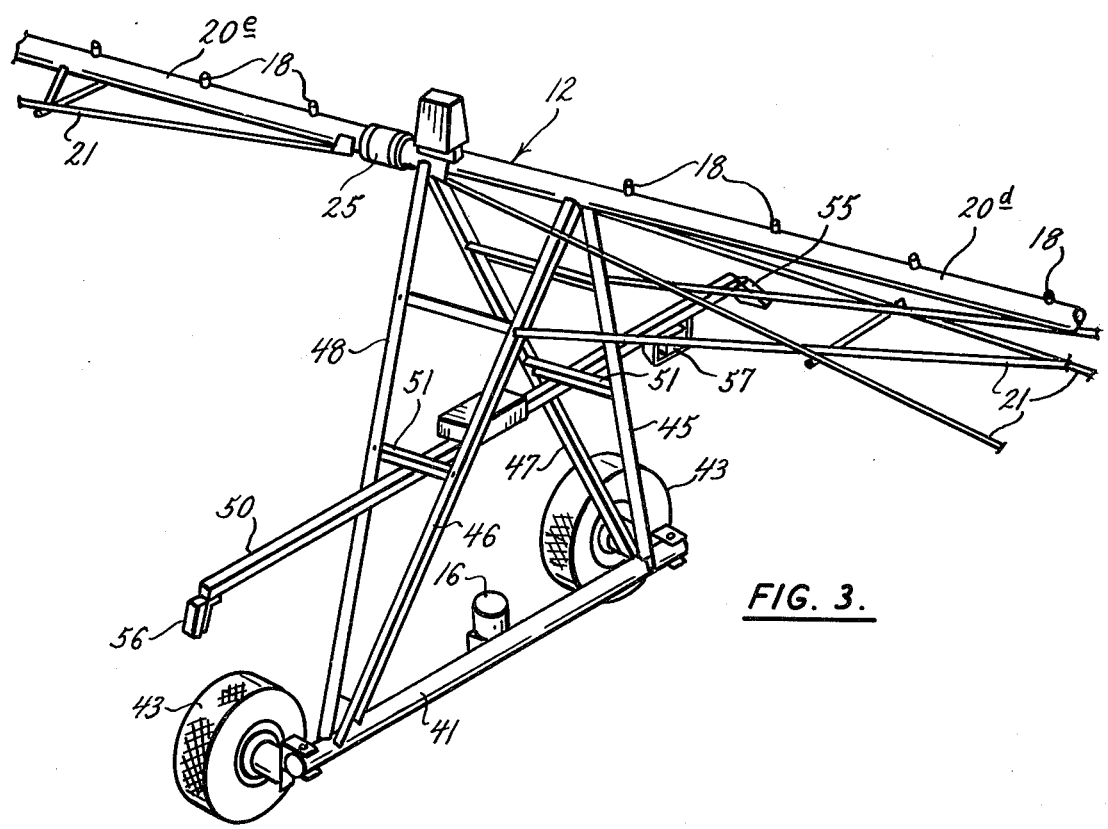
FIG. 3.
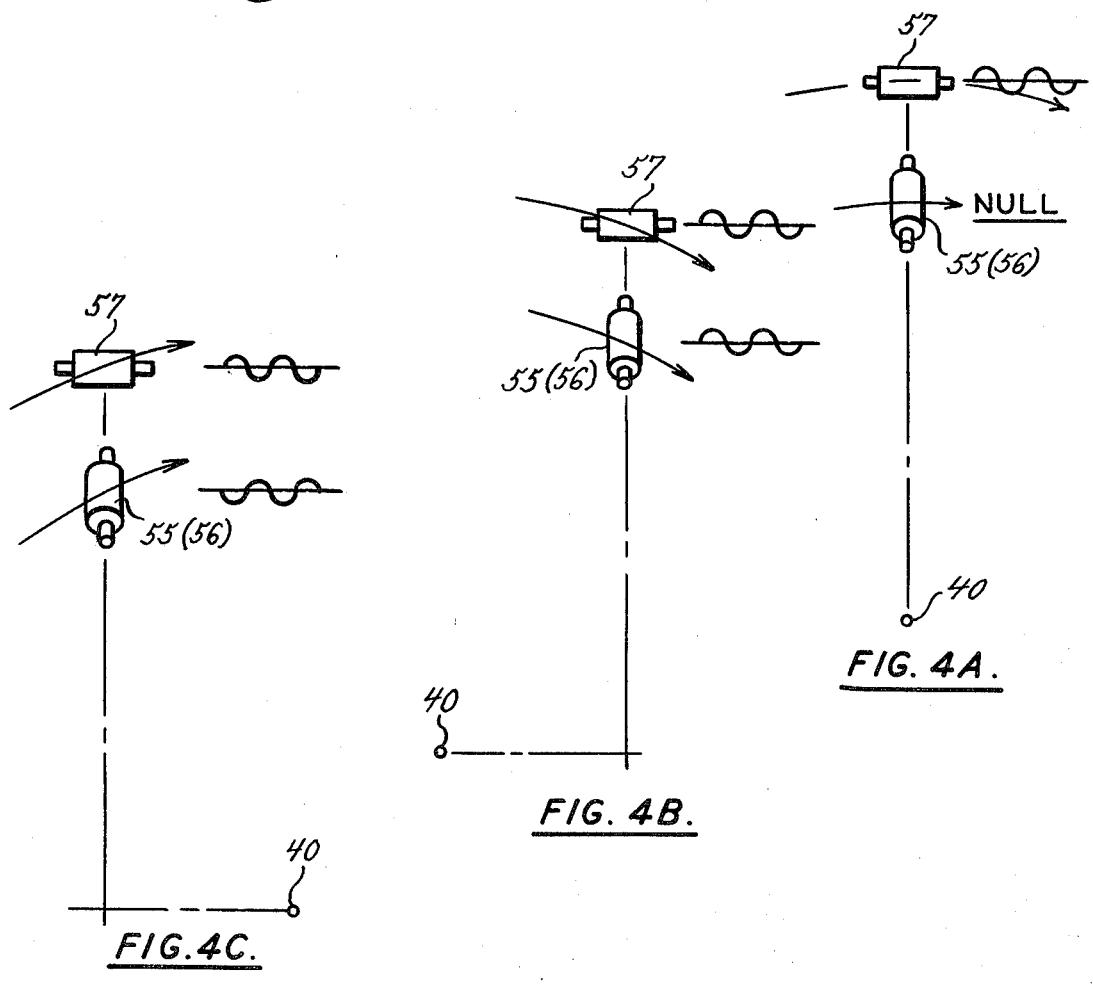
FIG. 4A.
FIG. 4B.
FIG. 4C.

LINEAR MOVE IRRIGATION SYSTEM AND CONTROL THEREFOR

BACKGROUND AND SUMMARY OF THE INVENTION

This invention relates to an irrigation system for irrigating land, and is specifically a type generally known as a linear move irrigation system. Such a system is characterized by its movement of the entire conduit over the field. The path of movement may be generally straight or curved, but it is contrasted to the rotating movement of systems commonly known as center pivot irrigation systems where one end of the conduit is anchored at a vertical axis about which the conduit rotates.

There are certain common features with both types of systems. Both have a conduit that extends over a portion of the field to be irrigated which is supported along its length by a series of support towers. Customarily these towers each have drive means associated therewith which, for example, can be electrically or hydraulically operated. Both systems also have a series of sprinklers or other means located along the conduit for dispensing liquid fed through the conduit onto the field, and both have some means for supplying the liquid to the conduit.

There have also been certain advantages and disadvantages associated with both. The problems of controlling the path of movement of a center pivot system are reduced by the fact that one end of the conduit is fixed except for its rotation about a vertical axis. Also, with one end of the conduit anchored, it is relatively easy to supply liquid to the conduit at that point. Such systems are well suited for fields of some configurations, with their suitability being greatly enhanced by recent innovations in corner systems as described and claimed in U.S. Pat. Nos. 3,797,517; 3,802,627; 3,902,668; and 3,979,062.

The linear move irrigation system would have the obvious advantage of being particularly suited for fields with square corners such as rectangular or even curved fields. This is because the pattern of irrigation produced by such a system is generally rectangular as the entire conduit moves in substantial alignment over the field. While this advantage has been apparent, the problem has been to simply, accurately, and reliably control the movement of such a system over the field where, unlike the center pivot system, no portion of the system is linearly fixed.

Proper control is critical. It is critical in maintaining uniform distribution of the liquid over the field, and in maintaining the tower wheels in the same wheel tracks as a linear move system moves back and forth over the field. Otherwise crop damage occurs by excessive mutilation from the wheels. It is also critical to ensure the supply of liquid (water) to the system. One such technique has been a water channel at the side and extending the length of the field to be irrigated. A pump, attached to the end tower of the system with a suitable conduit extending into the channel pumps water out of the channel as the entire system moves down the field. Accuracy of movement is important in order to maintain that conduit within the channel.

Various solutions have been proposed for solving these problems but none are believed by applicant to be entirely satisfactory. For example, one such solution is shown in U.S. Pat. No. 3,613,703 with Stout as the named inventor. In Stout the sensing is done at one end of the irrigation system with support towers at opposite ends of the conduit being controlled such that first one acts as the pivot for the conduit and then the other. As a result, the system moves as a series of alternating arced paths. In Stout, both ends of the system are not made to move at the same speed as the system moves along its defined path.

U.S. Pat. No. 3,974,845 with Indresaeter the named inventor, discloses a control for a linear move system making specific reference to the Stout patent. Unlike Stout, the control of the Indresaeter patent maintains the same speed for the control towers at opposite ends of the irrigation system unless a correction is called for. However, a primary disadvantage of the Indresaeter control is its complexity. The Indresaeter patent teaches the measuring or detecting of both angular and linear displacement of the irrigation system relative to the path of travel. These angular and linear displacements are sensed at a location at the end of the irrigation system. As a result, rather complex circuitry is provided for detecting or measuring these angular and linear displacements, processing the information, and generating signals appropriate for making the necessary corrections.

This invention has solved these problems and overcome the disadvantages of the prior art by providing a linear move irrigation system and control therefor which simply, accurately, and reliably controls the movement of the system over the field along a defined path without the need for complicated measuring and processing circuitry.

This is accomplished in the broad sense by sensing the displacement of a point located forward of the conduit relative to a defined path along which the conduit is to move in mass. It has been found preferable to locate this point and the defined path intermediate the outermost controlled towers and even at a centralized location of the conduit although they can be located at either end of the conduit as well. The movement of support towers near opposite ends of the conduit are automatically controlled in response to sensing a predetermined displacement of the point relative to the path to maintain the point over the path and maintain the wheel tracks of the conduit support towers generally parallel to the defined path. The towers controlled in response to the sensor are preferably located on opposite sides of the path where the path is at an intermediate location.

In a particularly preferred embodiment, the sensor is located at the end of an arm extending forwardly of the conduit and responds to a buried conductor (wire) to which is applied an electrical signal producing an electromagnetic field about the conductor, hence the conductor defining the path of movement over the field. In this embodiment the point is defined by the location of the sensor at the end of the arm and is considered a "real" point. As an alternative, the field coupling of this embodiment can be replaced by an electromechanical coupling where the conductor is replaced by a guide means such as a wire and the sensor has microswitches or the like at the end of the arm that are selectively actuated by contact with the wire when the point or sensor is off the path defined by the wire.

In another embodiment, the forward end of an arm is slidingly connected to a guide means such as a wire which defines the path of travel of the irrigation system. The rear end of the arm is connected to the conduit or its support for pivotal movement about a generally vertical axis. A sensor senses the angular displacement of the arm relative to the conduit from a predetermined angle. In this embodiment the system can also be thought of as sensing the displacement of an "imaginary" point located forward of the fixed relative to the conduit and coinciding with the sliding connection of the arm when the system is on the defined path. The sensor effectively detects when the "imaginary" point is off the path defined by the wire and controls the controlled towers in response thereto in much the same way as with the first embodiment.

This novel control technique has been found to provide extremely reliable, accurate, and exceptionally simple means for controlling the movement of such a system such that the wheels of the support towers stay in their tracks upon back and forth movement of the system over the field to minimize crop mutilation, and further making it possible to use a liquid (water) channel extending the length of the field as a liquid supply to the irrigation system. The result is an extremely uniform irrigation of the field.

DESCRIPTION OF THE DRAWINGS

FIG. 3 is a perspective view of a centralized support tower of the irrigation system of FIG. 1 with a sensor used with this invention mounted thereto.

FIGS. 4A, B and C are schematic views illustrating the operation of a sensor used with this invention.

DETAILED DESCRIPTION OF PREFERRED EMBODIMENTS

Figure 1:
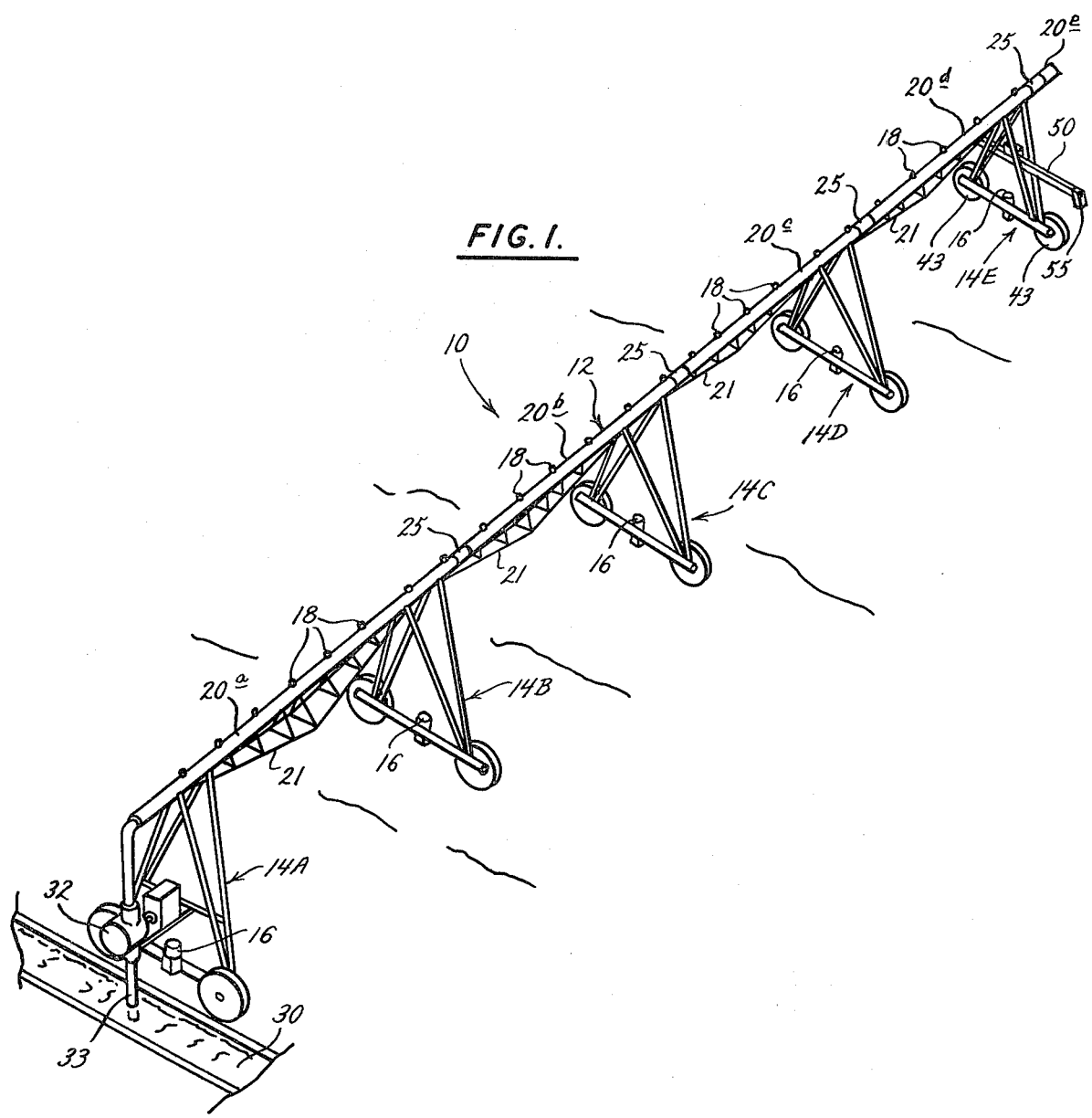
FIG. 1 is a perspective view of a linear move irrigation system of this invention and with which the control system of this invention is used.

With reference to FIG. 1 of the drawing there is schematically shown an irrigation system 10 of a particularly preferred embodiment of this invention which is of the linear move type. The system includes a conduit 12 extending over the field to be irrigated. Such conduits are usually of a substantial length and may be as much as a quarter of a mile or more. The conduit 12 is supported by a series of support towers 14 spaced along its length, each of the towers being self propelled such as by an electric motor 16 and appropriate gear boxes or the like commonly known in the art. While an electric drive is shown in this preferred embodiment, other types of drives such as hydraulic could also be used. A series of dispensers or sprinklers 18 are located along the conduit for the dispensing of liquid such as water or fertilizer fed through the conduit onto the field.

The conduit 12 is made up of conduit sections 20(a), 20(b), 20(c), and so on, each supported by a suitable truss arrangement 21 because of their long expanse, and each flexibly connected to the next by means of a suitable flex joint 25.

Such a system is characterized by the movement of the entire system down the field to be irrigated. In doing so, liquid such as water is pumped into the conduit as it moves down the field. Various means have been used for this purpose, but in this preferred embodiment there is provided a channel 30 filled with liquid such as water extending along the length of the field at one side, although the channel could be at another location along the conduit such as near the center. A pump 32, which may be engine or electrically powered, is mounted to the tower nearest the channel with a conduit 33 extending into the channel. It can be seen that the pump 32 and conduit 33 move with the end tower 14(a) and the entire irrigation system. With the channel filled with liquid, the liquid is pumped from the channel and into the conduit for disbursement through the sprinklers.

Figure 2:
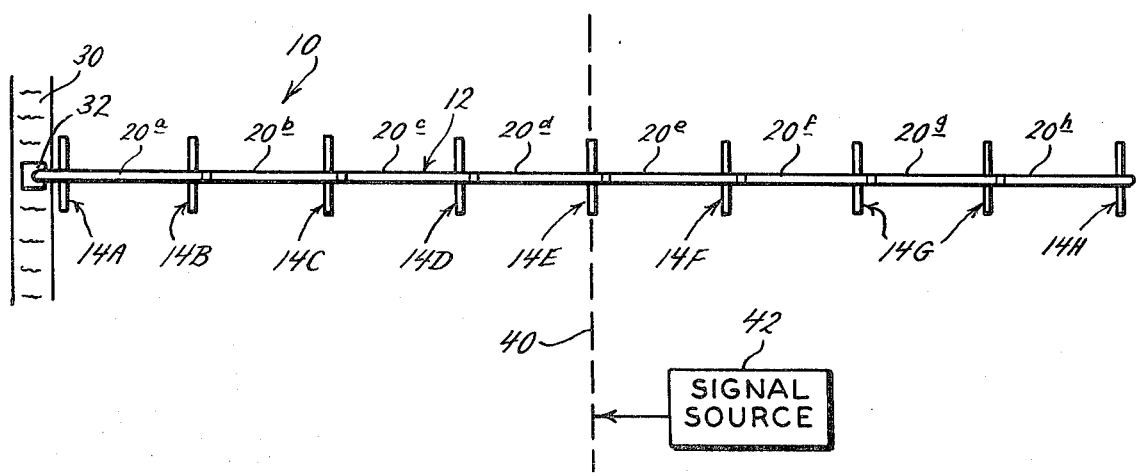
FIG. 2 is a schematic plan view of a field with a linear move irrigation system of this invention extending thereover.

Referring to FIG. 2, there is schematically shown a plan view of the irrigation system of this invention, which is preferably, although not necessarily, comprised of an odd number of support towers. Nine such towers are illustrated although greater and fewer numbers could be used. In accordance with this invention, the linear move system is controlled by use of some means defining a path along which the conduit is to travel with the conduit extending over the field away from the path and the wheel tracks of the support towers generally parallel to the path. On a flat field the conduit is maintained substantially normal relative to the path. In a preferred embodiment of the invention, the path is defined by a buried wire (conductor) 40 extending along the length of the field to be irrigated. If the field is rectangular, the wire 40 would be generally straight, but if the field is somewhat curved, the wire 40 would follow the curve. A signal source 42 is connected to the wire 40 to generate an electromagnetic field about the wire.

With particular reference to FIG. 2, there are intermediate towers 14B through 14G and end towers 14A and 14H. The center tower 14E is shown positioned generally in vertical alignment with the wire 40. Each of the intermediate towers 14B through 14G, including the center tower, has sensing means such as microswitches and the like, for sensing the angular displacement of adjacent pipe sections at the flex joint located near the tower. The drive for that tower is controlled in response to operation of the microswitches, and thus the angular deflection, to maintain the adjacent pipe sections in substantially straight alignment. This technique of sensing the angular deflections of adjacent pipe sections at a particular tower and controlling the drive of that tower to either energize the drive or de-energize it in order to maintain alignment of the adjacent pipe sections is well known in the art.

FIG. 3 shows the center tower 14E of this invention. Like each of the other towers, the tower 14E has a generally horizontal beam 41 extending transversely to the conduit 12. At each end of the beam 41 are mounted wheels 43 driven through a suitable gear box (not shown) by an electric motor 16. The motor 16 receives power through cables (not shown) carried by the conduit. The other end of the cables are connected to a suitable source of supply through a control circuit (to be described) which may include a percent timer. The conduit 12 is supported on truss members 45, 46, 47 and 48 extending between the beam 41 and the conduit. A bar or arm 50 is mounted to the truss members by suitable braces 51 so as to be parallel to, and vertically spaced from, the beam 41 and so as to be rigidly supported at a fixed angle relative to the conduit. That angle is preferably 90° although some deviation therefrom is permissable. Thus, the bar 50 also extends generally horizontally and transversely to the conduit.

A sensor is mounted to the bar 50 so as to overlie the buried wire 40 when the system is on the defined path. The sensor may be of the type described in U.S. Pat. No. 3,902,668, the entirety of which is incorporated herein by reference. In that patent there is described a coupler sensor and detector for operating the wheels of a boom tower to steer left or right as required to cause the tower to follow a path defined by a buried wire. The sensor and detector of that patent is similar to that shown in U.S. Pat. No. 3,468,391 for use with tractors. A similar sensor and detector could also be used with this invention with the output controlling the drives of the end towers 14A and 14H instead of the steering of the boom tower wheels of U.S. Pat. No. 3,902,668.

Another type of sensor could also be used similar to that of U.S. Pat. No. 3,009,525, which uses fewer antenna coils. A sensor of that general type will now be described in connection with this preferred embodiment.

Thus, there is shown in FIGS. 3 and 4 a sensor including antenna coils 55, 56, and 57. The coil 57 is a reference coil and is oriented with its axis generally horizontally and transversely to the buried wire. Each of the coils 55 and 56 is oriented with its axis at an acute angle relative to the horizontal and in a generally vertical plane with the buried wire when the coil is directly over the wire. The coils 55 and 56 are the same except that the coil 55 operates when the irrigation system moves in one direction down the field and the coil 56 operates when the irrigation system moves in the opposite direction. The coils 55 and 56 are spaced on opposite sides of the conduit, and the operating coil 55 or 56 is the one spaced forwardly of the conduit relative to its direction of travel. Thus, the coil 56 operates when the system moves in a direction out of the paper as viewed in FIG. 3, and the coil 55 operates when the system moves in a direction into the paper. In this way the system can be made to move continuously up and down the field. The coils 55, 56, and 57 sense the electromagnetic field generated about the buried wire. Voltages are induced in the coils as the coils move through the electromagnetic field around the wire 40, the field being developed by the signal applied to the wire from the signal source 42.

A constant frequency signal may be supplied to the wire. The alternating magnetic flux created by the buried wire from the signal imposed on it, encompasses the wire with a circular pattern. This induces a voltage in each of the coils 55, 56 and 57 proportional to the component of the flux vector that is projected along the coil axis. The phase of the voltage in each coil is determined by the relative direction of the flux vector component along the coil axis.

FIGS. 4A, B, and C illustrate this principle with the flux vectors shown by the arrows. Since the reference coil 57 is horizontal and generally transverse to the buried wire, its vector component is always in the same direction. However, since the coil 55 (56) is at an acute angle and oriented as heretofore described, the magnitude and direction of the vector component induced changes depending on its transverse position relative to the buried wire. As to each coil 55 and 56, if it is directly over the wire there is no vector component induced in the coil, (FIG. 4A). If it is to the right of the wire a vector component along its coil axis will be induced in one direction (FIG. 4B), and if it is to the left of the wire a vector component along its axis will be induced in the opposite direction (FIG. 4C). One of these vector components will be in phase with the vector component induced in the reference coil 57, and the other 180° out of phase. This difference in phase is used in detector and control circuits to control the drives of the end towers 14A and 14H.

Figure 5:
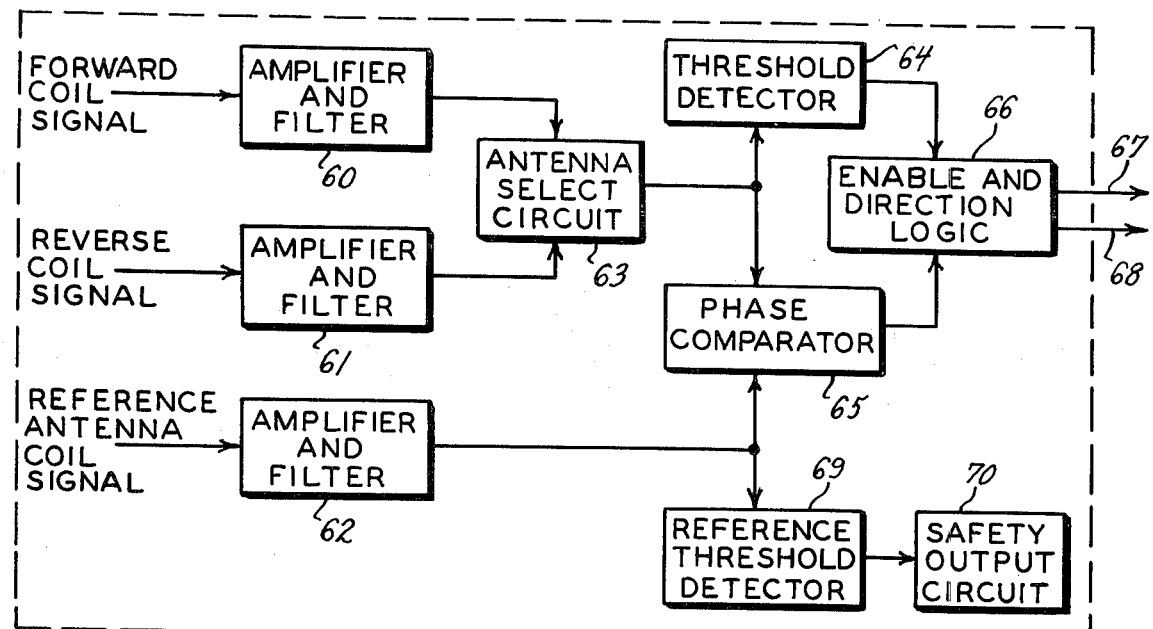
FIG. 5 is an electrical schematic block diagram of a detector network used with this invention.

FIG. 5 is a schematic of a detector circuit 59 for use with the output voltages from the coils 55, 56 and 57 to produce the control signals. Assuming for convenience of explanation that the coil 55 is the forward antenna coil and the coil 56 the reverse antenna coil, the outputs from the coils 55, 56 and 57 are fed to the inputs of amplifer and filter networks 60, 61 and 62 respectively. The outputs of the amplifer and filter networks 60 and 61 are fed to an antenna select circuit 63 which selects the signal from the appropriate one of the antennas 55 and 56 depending on the direction of travel of the irrigation system. The output of the antenna select circuit 63 is fed to a threshold detector 64 and a phase comparator 65.

The output from the amplifer and filter 62, representing the reference antenna, is also fed to the phase comparator 65, and the outputs of the threshold detector 64 and phase comparator 65 are both fed to an enable direction logic circuit 66 from which is generated the outputs 67 and 68 for use with the control network to be described.

As a safety feature, the output of the amplifer and filter 62, representing the signal from the reference antenna coil, is also fed to a reference threshold detector 69, the output of which is fed to a safety output circuit 70. The threshold detector 69 shuts down the system if the reference antenna output voltage drops below a preselected value indicating that the sensor is beyond a predetermined distance from the buried wire.

In operation of the network of FIG. 5, the phase comparator 65 compares the input signals from the appropriate one of the forward or reverse antenna coils as selected by the antenna select circuit 63. Also, the threshold detector measures the amplitude of the signal from the antenna select circuit 63. If the amplitude of the antenna output as selected by the circuit 63 is above a preselected level, the threshold detector 64 produces an output signal to the enable circuit 66. The enable circuit 66 continually sees a signal from the phase comparator, but only produces an output when there is a signal present at the output of the threshold detector 64. When both signals are present, the enable circuit 66 produces output signals to control the drive of an appropriate one of the end towers 14A or 14H as appropriate to bring the irrigation system back on the desired path of travel by operating certain relays in the manner which will now be described.

Figure 6:
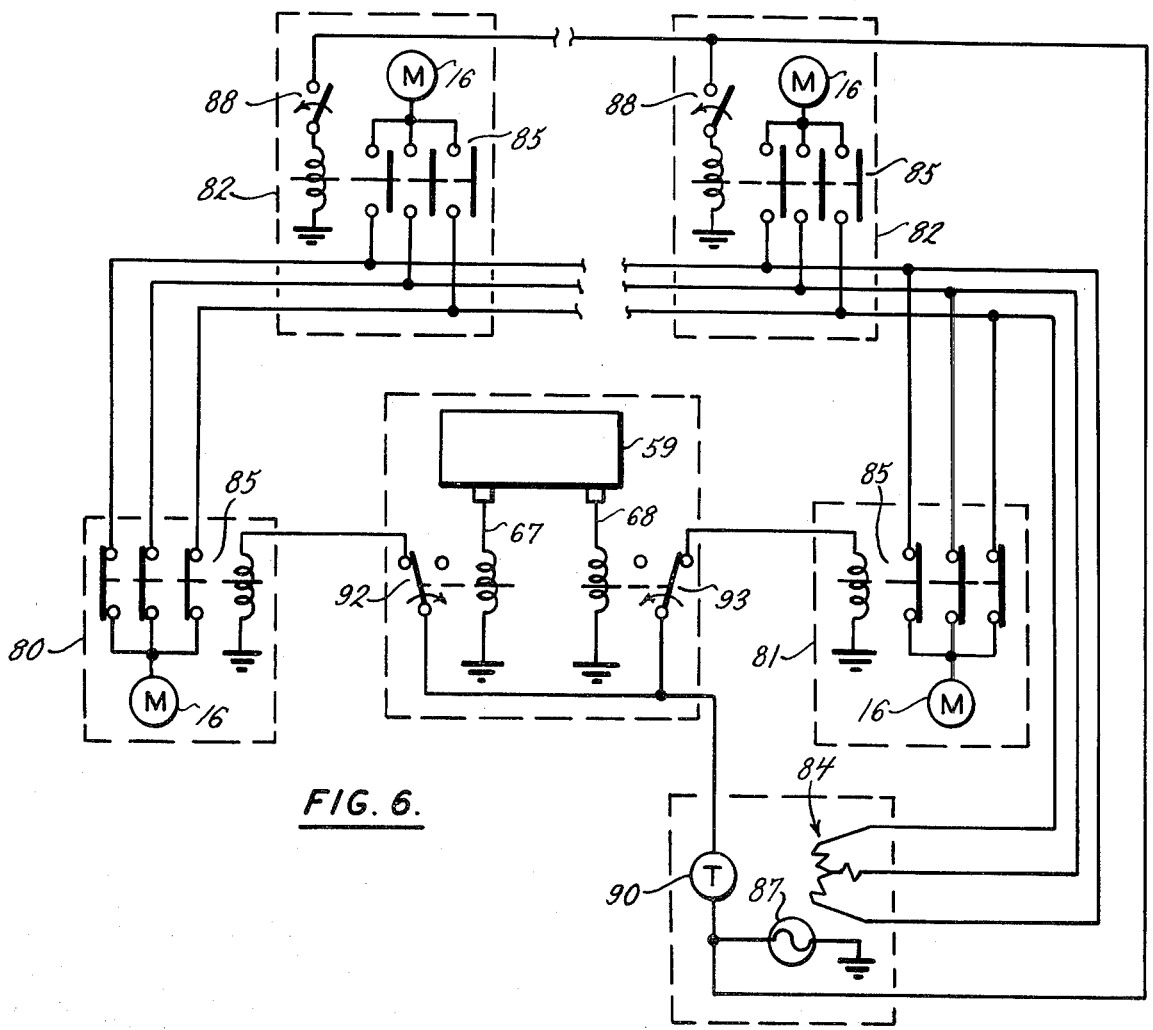
FIG. 6 is an electrical schematic diagram of a control network used with this invention.

With reference to FIG. 6 there is shown the detector network 59, with outputs 67 and 68 connected in a control network which further includes a control box 80 for the end tower 14A, a control box 81 for the end tower 14H, and control boxes 82 for each of the intermediate towers 14B–14G. Only two such control boxes 82 are shown but it is to be understood that one such box is provided for each intermediate tower. The control boxes 80 and 81 for the end towers are identical in so far as the control of this invention is concerned, and the control boxes 82 for the intermediate towers are also identical.

The control network includes a suitable source of three phase power 84 for operating each of the motors 16 of the drive towers through relays 85 associated with each motor. Another source of single phase power 87 is connected through microswitches 88 as previously referred to and located at each of the intermediate towers for sensing angular deflection of adjacent pipe sections at the flexible joints adjacent each intermediate tower. If the angular displacement at a particular tower becomes sufficient to close its associated microswitch 88, the relay 85 will close and the motor 16 of that tower will be energized to cause that tower to move so as to reestablish alignment of the adjacent pipe sections. After realignment, the microswitch 88 opens and the motor is deenergized.

The output of the power source 87 is also fed through a percent timer 90 to the wiper arms of relays 92 and 93. The timer 90 is a timing device that produces output voltage for only a selected portion of a selected interval of time so as to control the speed of the entire irrigation system. The relays 92 and 93 are normally closed as shown in the position illustrated in FIG. 6, and are operated to the normally open position only upon the energizing of their coils. The outputs 67 and 68 from the detector network 59 are connected to the coils of the relays 92 and 93, and the normally closed contacts of those relays are connected to the coils of the relays 85 associated with the end towers 14A and 14H.

Thus, under normal conditions, the relays 92 and 93 are closed, as shown, to energize the coils of the relays 85 and therefore close those relays as shown. With the relays 85 closed, the motors 16 of the end towers 14A and 14H are energized to drive those towers at a speed determined by the percent timer 90. The intermediate towers 14B–14G will maintain alignment with the end towers by operation of the microswitches 88 and relays 85 as heretofore described. However, if the sensor coils 55, 56 and 57 move off the defined path established by the buried wire a predetermined amount as established by the threshold detector 64, an output signal will be generated on an appropriate one of the outputs from the detection network 59 to actuate the appropriate one of the relays 92 or 93 to the normally open position to open the relay 85 of the appropriate one of the end towers 14A or 14H and deenergize its motor. This allows the entire irrigation system to pivot about the deenergized end tower until the sensor is back over the wire, at which time the energized relay 92 or 93 is deenergized back to its normally closed position so that both end towers are again energized. The motors 16 of the intermediate towers 14B–14G are of a somewhat higher RPM than those of the end towers 14A and 14H so that the intermediate towers can correct for misalignment.

Operation of the Embodiment of FIGS. 1 Through 6

As long as the system is generally normal to the wire with the antenna (coils 57 and 55 or 56) over the wire, the system is in a null zone so there are no signals on the outputs from the detector network 59 to energize the relay 82 or 83 to a normally open condition. This means that the motors 16 of both end towers are energized in accordance with the output of the percent timer 90 with the entire irrigation system moving down the field with alignment of the conduit 12 maintained as heretofore described. Actually, from a start condition, the end towers 14A and 14H first start to move. As the end conduit sections 20A and 20H form angles with the next inwardly adjacent conduit sections 20B and 20F respectively, the towers 14B and 14G start to move in response to closing of their microswitches 88, and so on inwardly until the center tower 14E begins to move. Now with the entire system moving down the field, the intermediate towers 14B–14G catch up to the end towers because of their higher RPM motors and maintain the conduit 12 in generally straight alignment.

If the system starts to get off course, the sensor (antenna) will move to one side of the wire. When this happens, the detector circuit 59 generates an output signal, in the manner described, which energizes the relay 82 or 83 associated with the end tower 14A or 14H on the side of the buried wire opposite the sensor. This interrupts power to that end tower causing it to stop. The other end tower continues to run and the entire system, while maintaining a generally straight line, pivots about the stationary end tower. This action brings the sensor back in proximity of the buried wire to remove the output signal from the detector network, de-energize the relay 82 or 83 to its normally closed position, and again energize the drive for the previously stationary end tower. Now both end towers again move down the field. In this manner the control system will continue to stop and start one end tower of the system or the other to maintain the direction of travel of the irrigation system along the wire, and maintain the wheel tracks of the support towers generally parallel to the wire.

It can be seen that the sensor coil 55 or 56, essentially acts as a point located forward of the conduit, the object being to maintain that point over the defined path. This point is referred to as a "real" point as it actually coincides with the sensor coil 55 or 56 at the end of the arm or bar 50.

The sensitivity of control is determined by the threshold detector 64. Appropriate adjustments can be provided to adjust the threshold level and thus select the sensitivity level to meet particular operating conditions.

The sensor can be spaced forwardly at one end of the conduit, but preferably it is spaced forwardly from the conduit at a location intermediate the ends of the conduit, and more preferably at a generally central location. The forward location of the sensor and the control of the towers near the end of the system in response to the sensor provide significant advantages in control sensitivity and reliability.

With the accuracy provided by this system, the towers are maintained in their wheel tracks to prevent crop mutilation, the tower nearest the channel 30 is maintained in close alignment with the channel for proper delivery of water or other liquid from the channel to the irrigation system, and there is an uniform distribution of liquid to the field.

As previously noted, the operative coil 55 or 56 of the sensor is the one that is spaced forwardly of the conduit relative to the direction of travel of the system. Under these conditions, a correction of the system moves the coil toward the path. This contrasts to the condition where the operative coil is spaced behind the conduit relative to the direction of travel in which case a correction to move the system back on the path may actually cause the sensor coil to swing further away from the path, at least initially. Thus, the forward displacement of the coil is much preferred.

It has been found that the amount of forward spacing of the sensor, or real point, is not very critical. For example, while a forward spacing of approximately ten feet has been found to work very well, a lesser or greater spacing is permissible. The limitations are practical ones. As the spacing becomes greater, the control becomes more sensitive. Excessive sensitivity would be undesirable as even a slight displacement of the sensor from the defined path would de-energize the drive of one of the support towers controlled by the sensor and unnecessarily slow the movement of the system down the field. Also, the greater the distance the greater the structural problems for supporting the sensor. The lesser the distance or spacing the less the sensitivity becomes and the greater becomes the allowed deviation from the defined path. Excessive deviation is also undesirable. Thus, the forward spacing of the sensor from the conduit should be sufficient to maintain the irrigation system along the defined path without excessive deviation therefrom, and not so great that the control system is excessively sensitive in maintaining the irrigation system along the defined path.

While a single buried wire system has been described with the first embodiment, it is also contemplated that a multiple wire system could be used with a suitable sensor and detector for sensing a null between the wires. Also, while it is preferred to deenergize the one controlled tower, allowing the entire system to pivot about that tower to make the correction, it would also be possible to substantially reduce the relative speed of that controlled tower so that, where the controlled tower is an end tower, the entire irrigation system pivots about an imaginary point spaced away from the end but in alignment with the irrigation system. This arrangement might be particularly useful where the path defining means such as the conductor or wire is at the end of the conduit rather than near the center. It will also be apparent that the same effect can be achieved by increasing the speed of the other controlled tower rather than reducing the speed of the one controlled tower, it being the relative speeds of these towers that must be controlled to effect a corrective pivotal or arcuate movement to bring the system back on the defined path.

It is to be understood that an increase or decrease in speed of a controlled tower in order to effect the necessary corrective movement can be achieved in several ways. For example, the speed of one such tower can be reduced relative to the other by driving the one at a slower instantaneous speed. Another way is to periodically de-energize the drive of the one tower during the time interval when the corrective movement takes place to effect an average reduction in speed for that interval.

It should further be noted that while it is preferred that the end towers be controlled in response to the sensor, some deviation from this is permissible. For example, on long systems the next to the end towers could be controlled in response to the sensor by substantially reducing their speeds, and good results could be achieved.

Figure 7:
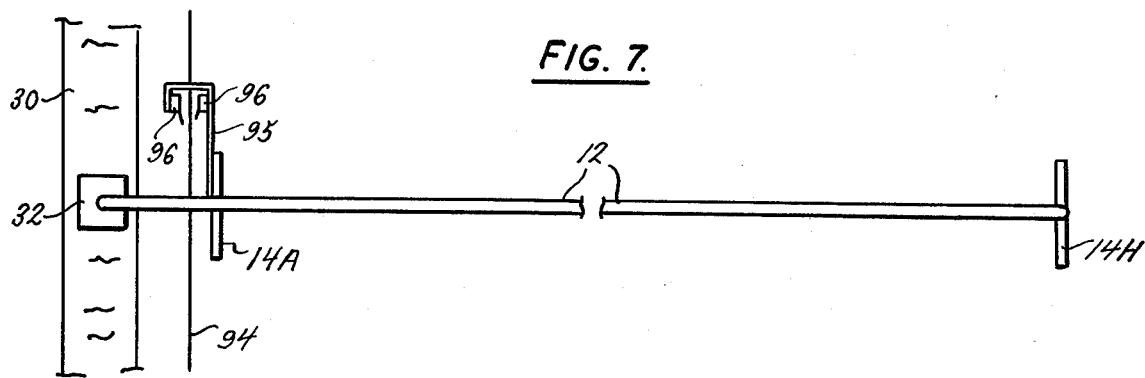
FIG. 7 is a schematic illustrating an alternate embodiment of the control system of FIGS. 1 through 6.

As an alternative to the electromagnetic field coupling of the first described embodiment, a mechanical coupling arrangement as shown in FIG. 7 can be used. The alternate arrangement is shown schematically as its principle of operation is basically the same as with the first embodiment.

Rather than the conductor with the electromagnetic field generated thereabout and the sensing coils field coupled thereto, the path of the irrigation system can be defined by a guide means such as a wire, rail, or the like and the sensor can be an electromechanical device selectively actuated by contact with the guide means.

Thus, referring to FIG. 7 there is shown essentially the same irrigation system as with the first described embodiment with the conduit 12, and towers including end towers 14A and 14H. The guide means such as a wire 94 extends the length of the field to be irrigated and is shown at the end of the conduit 12 although it could be located anywhere along the conduit. The wire extends above the ground and is anchored at each end in a manner commonly known in the art. An arm 95 extends forwardly to the conduit and is generally the same as the arm 50 of the first described embodiment except that the forward end of the arm is adapted for mounting electromechanical sensors such as microswitches 96. The switches 96 are positioned at each side of the wire 94 such that one is actuated upon engagement with the wire as the arm swings to the right as viewed in FIG. 7 and the other is actuated upon engagement with the wire as the arm swing to the left. The microswitches are in a suitable circuit to control the appropriate one of the towers 14A or 14H in response to the actuation of the switches 96 to maintain the sensor, or switches 96, on the path defined by the wire.

Rather than the switches 96 being spaced from the wire as shown, they can be spring loaded so both normally engage the wire when the irrigation system is on path. This has an advantage that movement of the system to completely disengage both switches from the wire can be made to automatically shut down the system.

Basically, the only difference between this alternate embodiment and the one first described is the use of electromechanical rather than electrical sensing means. The sensor, which is the microswitches 96, is located at the forward end of the arm and defines a forwardly spaced point just as with the first embodiment. The purpose is to keep that point or sensor on the path just as with the first embodiment.

Figure 8:
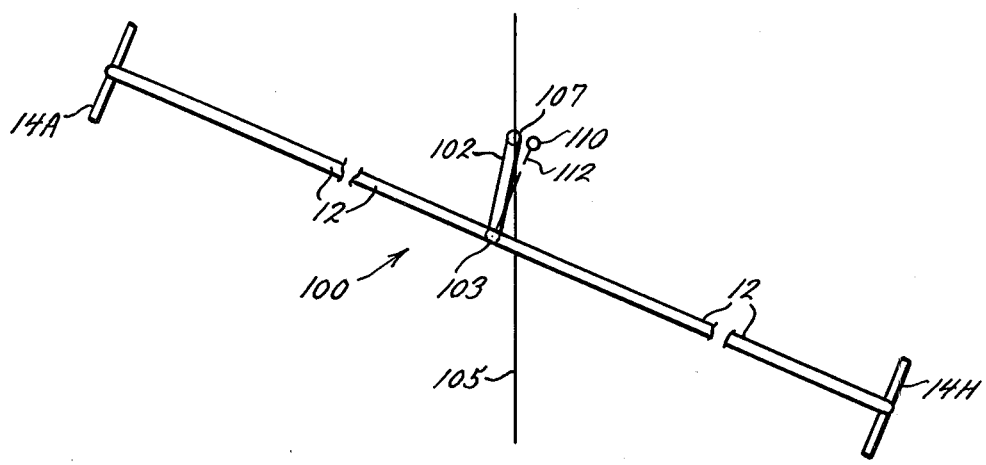
FIG. 8 is a schematic illustrating still another embodiment of the control system of this invention.

The Preferred Embodiment of FIGS. 7 & 8

Referring to FIG. 8 there is shown an irrigation system 100 of another embodiment of this invention which is essentially the same as the first embodiment except for the differences to be described. The primary difference is that instead of coils 55 and 56 located at the end of the arm 50 where the arm 50 is angularly fixed relative to the conduit, this embodiment has an arm 102 pivotally connected at 103 such as to the conduit or a conduit support member for pivotal movement about a generally vertical axis. Also, instead of using a buried wire to define the path of movement of the system, this embodiment uses a guide means such as a wire 105 anchored at both ends and extending down the field to be irrigated above the ground much the same as the alternate embodiment of FIG. 7. The forward end of the arm 102 is slidably connected at 107 to the wire by any suitable means. Thus, as the system is driven along the defined path, the forward end of the arm 102 always remains in sliding engagement with the wire 105 while the rearward end of the arm pivots relative to the conduit as the conduit deviates from the defined path. An angle sensor (not shown) senses when the angle x between the arm and conduit deviates from a preselected angle, such as for example 90°, and the relative speed of appropriate support towers such as the towers 14A and 14H at opposite ends of the conduit are controlled in a manner similar to the first embodiment to maintain the angle x at 90°. When the angle x is 90°, both controlled end towers are driven forward at the same speed causing the angle x to again deviate from 90° at which time another correction occurs as before until finally the irrigation system is back on the defined path.

The angle sensor is not shown, but can be of a type where microswitches are actuated upon angular movement of the arm beyond preselected limits. These switches operate in a circuit to control the controlled towers 14A and 14H.

Operation of the Embodiment of FIG. 8

With particular reference to FIGS. 9A–9G, the operation of the embodiment of FIG. 8 will be more specifically described. It is to be understood that the deviations and misalignments of the irrigation system relative to the defined path are in some instances greatly exaggerated in FIGS. 8 and 9A–9G for purposes of illustration.

Figure 9G:
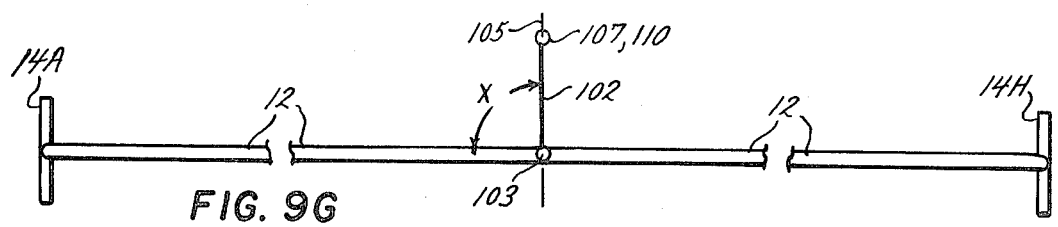
FIGS. 9A–9G are schematics illustrating the manner in which the irrigation system of FIG. 8 corrects to the defined path.
Figure 9F:
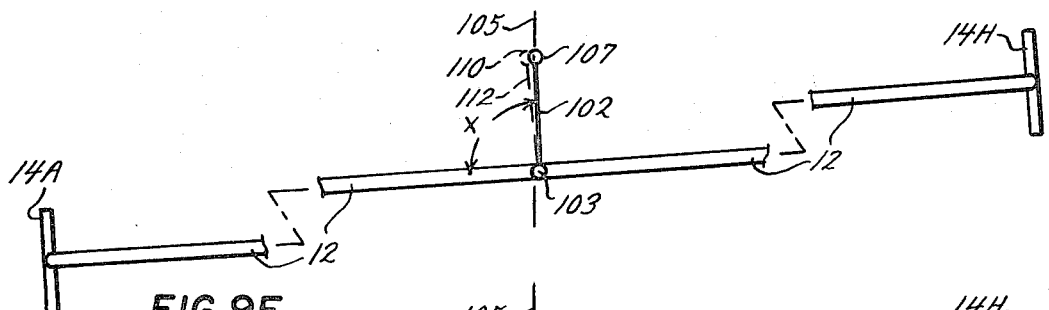
Figure 9E:
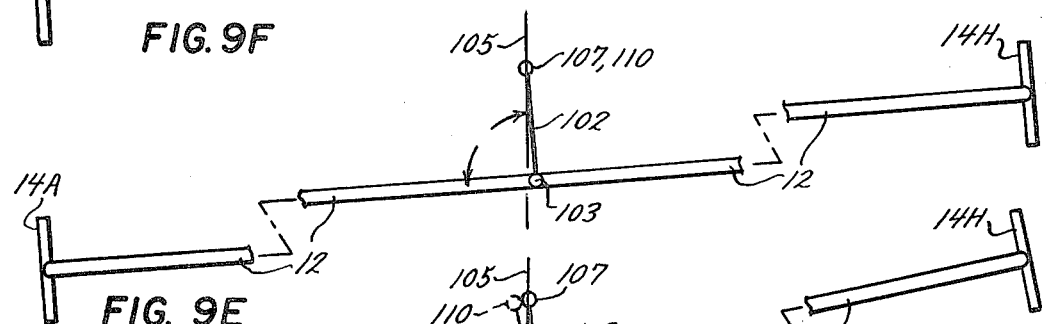
Figure 9D:
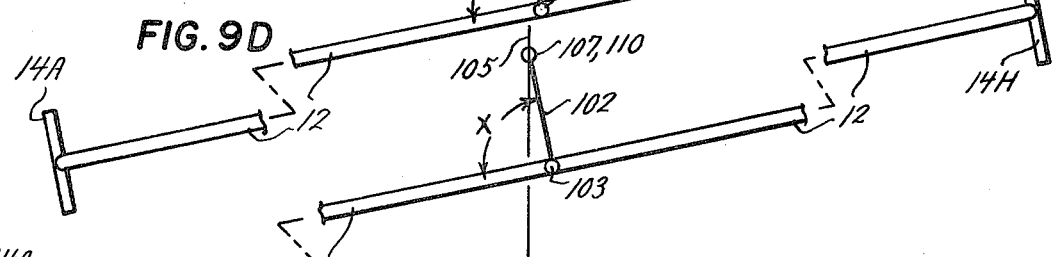
Figure 9C:
Figure 9B:
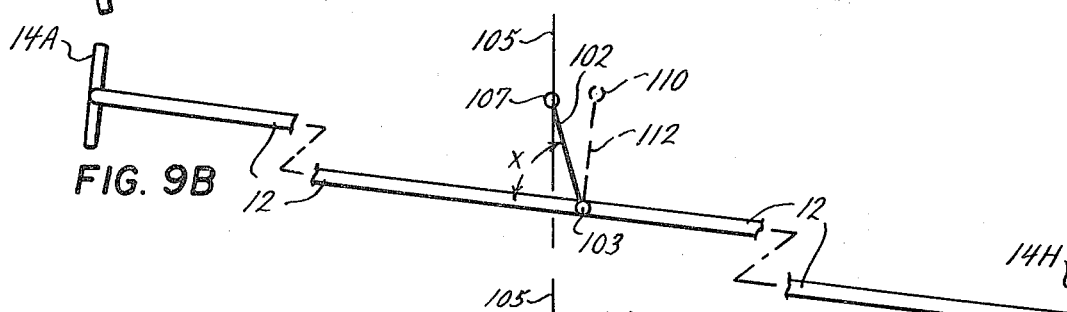
Figure 9A:
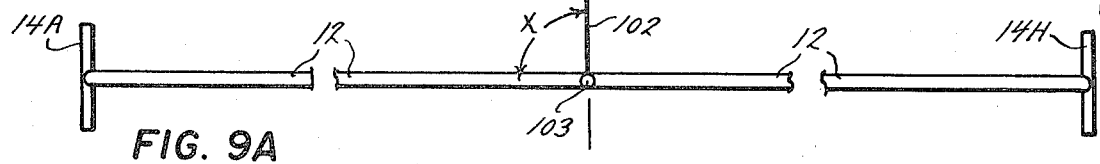

First it will be assumed that the irrigation system is moving along the defined path as shown at the position of FIG. 9A. In this position, the conduit is generally normal to the guide wire and the angle x formed between the conduit and the arm is approximately 90°. It will further be assumed that for some reason the irrigation system moves off the defined path to the position shown at 9B. Again, it should be remembered that the deviation of position B is greatly exaggerated for purposes of illustration. At position 9B the pivot location 103 of the arm has moved to the right of the wire and the angle x has become acute. When the angle x becomes acute to a predetermined amount, this condition is sensed by the angle sensor and the drive tower 14A is caused to stop with the tower 14H allowed to continue moving forward. This causes the system to effectively pivot about the tower 14A until the angle x becomes 90° as shown at position 9C. It should be noted that the tower 14A actually has not moved forward any appreciable amount between positions 9B and 9C. The tower 14A primarily pivots rather than moves forward but the spacing is provided between positions 9B and 9C for clarity of illustration.

When the system reaches position 9C, both end drive towers are made to move forward full speed. Further analysis will show that it is also possible to view the correction from position 9B to 9C as moving an "imaginary" point 110, toward the wire 105 to coincide with the forward end of the arm at the slide connection 107. The point 110 is located at the end of an imaginary line 112 equal in length to the arm 102. The line 112 forms a 90° angle with the conduit and intersects the pivot point 103. Thus the point 110 and line 112 of this embodiment are equivalent to the sensor 55 or 56 and arm 50 of the embodiment of FIGS. 1 through 6. When the imaginary point 110 is to the right of the wire as viewed in FIGS. 9A–9G, the left end tower 14A is caused to stop and the right end tower 14H is allowed to drive forward until the condition of position 9C is reached with the imaginary point 110 back on the wire.

With both of the end towers driving forward at position 9C, the arm 102 begins to pivot causing the angle x to become obtuse. It also causes the imaginary point 110 to move to the left of the wire as viewed in FIGS. 9A–9G. When the angle x becomes obtuse a predetermined amount (or the imaginary point 110 moves to the left of the wire a predetermined amount) this condition is sensed by the sensor and in response thereto the right end tower 14H is caused to stop and the left end tower 14A allowed to drive forward until the angle x is again 90° and the imaginary point 110 is back on the wire as shown at position 9E. Again it should be noted that the movement between position 9D and 9E is actually a pivotal movement about the tower 14H there being no appreciable advancement of tower 14H between positions 9D and 9E.

At position 9E both end towers are again caused to move forward at the same speed until once again the angle x becomes obtuse (or the imaginary point 110 moves to the left of the wire) a predetermined amount. When this occurs, as shown by position 9F, the condition is again sensed by the sensor and the right end tower 14H again caused to stop with the left end tower driving forward until the angle x again becomes 90° and the imaginary point 110 again overlies the wire. This procedure is repeated until the angle x is 90° and the imaginary point 110 is over the wire as shown at position 9G. At position 9G both end towers are driven forward at the same speed and this condition will continue until a deviation similar to that shown in position 9B again occurs at which time the corrective procedure is repeated.

It is to be understood that while this embodiment of the invention is shown with the wire at an intermediate location of the conduit 12, the wire could be at other locations along the length of the conduit including at either end. Also, as with the first described embodiment, it need not be the outermost towers 14A and 14H that are controlled in response to the sensor although control of the end towers is believed to produce superior results. In addition, just as with the first described embodiment, the one tower need not be completely stopped but rather the relative speeds of the controlled towers may be changed, such as by decreasing the speed of one or increasing the speed of the other, to effect a corrective pivotal or arcuate movement to bring the system back on the defined path.

While the angle x at which both controlled drive towers are made to move forward at the same speed is preferably 90°, some deviation from this is permissable as long as a predetermined angle is used. It will be seen that as the system moves from position 9B to position 9G, the pivot 103 of the arm 102 moves closer to the wire. Also, just as in the first described embodiment it is the controlled tower on the side of the path opposite the "real" point that is caused to slow down or stop, so with this embodiment it is the controlled tower on the side of the wire opposite the "imaginary" point that is caused to slow down or stop. Thus, the irrigation system of this invention can be considered as one where it is the object to keep the point over the defined path and to control the movement of towers near opposite ends of the conduit in response to predetermined displacement of the point relative to the path so as to maintain the point over the path. There is no need to measure or detect both linear and angular displacements. It is only necessary to determine whether the point is on or off the path and to make the necessary corrections in response thereto.

Various changes and modifications may be made in this invention, as will be readily apparent to those skilled in the art. Such changes and modifications are within the scope and teaching of this invention as defined by the claims appended hereto.

What is claimed is:

1. In a linear move irrigation system for irrigating a field and having a conduit for extending over the field to be irrigated, said conduit supported above the ground by a series of support towers each having drive means associated therewith, the conduit having a series of liquid dispensers located along its length for dispensing liquid fed through the conduit to the field, a control system for controlling the movement of the system over the field, said control system comprising means defining a preselected path along which the irrigation system is to move, sensor means at a location along said conduit for sensing the displacement of a point relative to said path, said point being located forward of the conduit relative to its direction of travel, and means responsive to said sensor means sensing such a displacement for automatically controlling the drive means of towers near opposite ends of said conduit.

2. In the linear move irrigation system of claim 1 wherein said point is located forward of the conduit a sufficient distance to maintain said irrigation system along said preselected path as said irrigation system moves therealong without excessive deviation therefrom.

3. In the linear move irrigation system of claim 1 wherein said point is located forward of the conduit a distance not so great that said control system is excessively sensitive in maintaining said irrigation system along said preselected path as said irrigation system moves therealong.

4. In the linear move irrigation system of claim 1 wherein said sensor means is at an intermediate location along said conduit, and wherein the sensor responsive means further comprises means for automatically controlling the drive means of towers on opposite sides of said sensor means.

5. In the linear move irrigation system of claim 4 wherein said sensor means is near the center of said conduit, and said towers, the drive means of which are controlled in response to the sensor means, are near each end of the conduit.

6. In the linear move irrigation system of claim 1 wherein said path defining means further comprises at least one buried wire and said sensor means is field coupled to said wire.

7. In the linear move irrigation system of claim 4 further comprising means in response to a predetermined displacement of said point to one side of said path for stopping said tower, the drive means of which are controlled in response to the sensor means, on that side of said path opposite the point.

8. In the linear move irrigation system of claim 7 wherein said sensor means is located near the center of the conduit, and the towers, the drive means of which are controlled in response to the predetermined displacement of the point are the outermost towers at the ends of the conduit.

9. In the linear move irrigation system of claim 4, further comprising means in response to a predetermined displacement of said point to one side of said path for changing the speed of at least one of said controlled towers relative to the other.

10. In the linear move irrigation system of claim 1 wherein said point is located on an arm extending forwardly of said conduit, said arm maintaining a fixed angle relative to said conduit.

11. In the linear move irrigation system of claim 10 wherein said angle is approximately 90°.

12. In the linear move irrigation system of claim 1 further comprising an arm extending forwardly of said conduit and pivotally mounted thereto, a guide means defining said preselected path, said arm being engaged with said guide means for movement therealong at a location forward of said conduit, said sensing means sensing the angle between said arm and said conduit.

13. In a linear move irrigation system for irrigating a field and having a conduit for extending over the field to be irrigated, said conduit supported above the ground by a series of support towers each having drive means associated therewith, the conduit having a series of liquid dispensers located along its length for dispensing liquid fed through the conduit to the field, a control system for controlling the movement of the system over the field, said control system comprising means defining a preselected path along which the irrigation system is to move, sensor means at a location along said conduit for sensing the displacement of a point relative to said path, said point being located forward of the conduit relative to its direction of travel, and means responsive to said sensor means sensing such a displacement for automatically controlling the drive means of towers near opposite ends of said conduit, said tower drive means being controlled such that the speed of the left most controlled tower is slower relative to the speed of the right most controlled tower when said point is to the right of said path and the speed of the right most controlled tower is slower relative to the speed of the left most controlled tower when said point is to the left of said path.

14. A linear move irrigation system for irrigating a field comprising a conduit for extending over the field to be irrigated, said conduit supported above the ground by a series of support towers each having drive means associated therewith, a series of dispensers located along the length of the conduit for dispensing liquid fed through the conduit to the field, and a control system for controlling the movement of said irrigation system over the field, said control system further comprising at least one buried conductor defining a preselected path along which the irrigation system is to move with the wheel tracks of said support towers generally parallel to said path, means for generating an electromagnetic field about the conductor, sensor means located at a position forward of said conduit for movement therewith, said sensor means having field sensing means associated therewith and producing output signals in response to a predetermined displacement of said sensor means relative to said path, and means responsive to the output signals of said sensing means for controlling drive means of towers near opposite ends of said conduit.

15. The irrigation system of claim 14 wherein said sensor is located forward of the conduit a sufficient distance to maintain said irrigation system along said preselected path as said irrigation system moves therealong without excessive deviation therefrom.

16. The irrigation system of claim 14 wherein said sensor is located forward of the conduit a distance not so great that said control system is excessively sensitive in maintaining said irrigation system along said preselected path as said irrigation system moves therealong.

17. The irrigation system of claim 14 wherein said sensor means is at an intermediate location along said conduit and wherein the sensor responsive means further comprises means for automatically controlling the drive means of towers on opposite sides of said sensor means.

18. The irrigation system of claim 17 wherein said sensor means is located substantially near the center of said conduit, and said towers, the drive means of which are controlled in response to said output signal, are near each end of the conduit.

19. The irrigation system of claim 17 further comprising means in response to the output signals of said sensor means to normally drive said controlled towers at approximately the same speed when the sensor means is over said path, and for changing the speed of at least one of said controlled towers relative to the other upon predetermined displacement of said sensor means from said path to bring said sensor back over said path.

20. The irrigation system of claim 17 further comprising means in response to the output signals of said sensor means to normally drive said controlled towers at approximately the same speed when the sensor means is over said path, and for substantially reducing the speed of the controlled tower on the side of said path opposite said sensor means relative to the speed of the controlled tower on the same side of said path as said sensor means, upon predetermined displacement of said sensor means from said path.

21. The irrigation system of claim 20 further comprising means for controlling the drive means of the remaining towers to maintain substantial alignment of all of the towers and the conduit supported thereon as the irrigation system moves over the field.

22. The irrigation system of claim 21 wherein the towers, the drive means of which are controlled in response to said output signals, are the outermost towers at the ends of the conduit.

23. The irrigation system of claim 14 wherein said sensor is located on an arm extending forwardly of said conduit, said arm maintaining a fixed angle relative to said conduit.

24. The irrigation system of claim 23 wherein said angle is approximately 90°.

25. A linear move irrigation system for irrigating a field comprising a conduit for extending over the field to be irrigated, said conduit supported above the ground by a series of support towers each having drive means associated therewith, a series of dispensers located along the length of the conduit for dispensing liquid fed through the conduit to the field, and a control system for controlling the movement of said irrigation system over the field, said control system further comprising at least one buried conductor defining a preselected path along which the irrigation system is to move with the wheel tracks of said support towers generally parallel to said path, means for generating an electromagnetic field about the conductor, a sensor located at a position forward of said conduit for movement therewith, said sensor having field sensing means associated therewith and producing output signals in response to a lateral displacement of said sensor relative to said path, and means responsive to the output signals of said sensor for controlling drive means of towers near opposite ends of said conduit, said tower drive means being controlled such that the speed of the left most controlled tower is slower relative to the speed of the right most controlled tower when said sensor is to the right of the path and the speed of the right most controlled tower is slower relative to the speed of the left most controlled tower when the sensor is to the left of said path.

26. A linear move irrigation system for irrigating a field comprising a conduit extending over the field to be irrigated, said conduit supported above the ground by a series of support towers each having drive means associated therewith, the conduit having a series of dispensers located along its length for dispensing liquid fed through the conduit to the field, and a control system for controlling the movement of the system over the field, said control system comprising means defining a preselected path along which the irrigation system is to move, a sensor located at a position forward of said conduit for movement therewith for sensing the lateral displacement of said sensor means relative to said path, means in response to said sensor to drive outer towers of said irrigation system at approximately the same speed when the sensor is over said path and for changing the speed of at least one of said outer towers relative to the other upon a predetermined displacement of said sensor to effect a corrective movement of said irrigation system toward said path, and means for controlling the drive means of the remaining towers to maintain substantial alignment of all of the towers, and the conduit supported thereon, as the irrigation system moves over the field.

27. The irrigation system of claim 26 wherein said sensor is located on an arm extending forwardly of said conduit, said arm maintaining a fixed angle relative to said conduit.

28. An irrigation system for irrigating a field comprising a conduit for extending over the field to be irrigated, said conduit support above the ground by a series of support towers each having drive means associated therewith, a series of dispensers located along the length of the conduit for dispensing liquid fed through the conduit to the field, and a control system for controlling the movement of said irrigation system over the field, said control system further comprising at least one buried conductor defining a preselected path along which the irrigation system is to move with the wheel tracks of the control towers generally parallel to said path, means for generating an electromagnetic field about the conductor, a sensor located at a centralized position along the conduit and forwardly of said conduit, said sensor having field sensing means associated therewith and producing output signals in response to a predetermined displacement of said sensor relative to said path, means in response to the sensor to drive outer towers of said irrigation system at approximately the same speed when the sensor is over said path and for changing the speed of at least one of said outer towers relative to the other upon a predetermined displacement of said sensor relative to said path, and means for controlling the drive means of the remaining towers to maintain substantial alignment of all of the towers and the conduit supported thereon as the irrigation system moves over the field.

29. The irrigation system of claim 28 wherein said sensor is located on an arm extending forwardly of said conduit, said arm maintaining a fixed angle relative to said conduit.

30. A linear move irrigation system for irrigating a field comprising a conduit extending over the field to be irrigated, said conduit supported above the ground by a series of support towers each having drive means associated therewith, the conduit having a series of liquid dispensers located along its length for dispensing liquid fed through the conduit to the field, a control system for controlling the movement of the irrigation system over the field, said control system further comprising means defining a preselected path along which the irrigation system is to move, sensor means at a location along said conduit and spaced forward of said conduit relative to the direction of travel of the irrigation system for sensing its lateral displacement relative to said path, and means responsive to said sensor means sensing such a displacement for automatically controlling the drive means of towers near opposite ends of said conduit to maintain said sensor means on said path.

31. The irrigation system of claim 30 wherein said sensor means is located on an arm extending forwardly of said conduit, said arm maintaining a fixed angle relative to said conduit.

32. The irrigation system of claim 31 wherein said sensor means is located forward of the conduit a sufficient distance to maintain said irrigation system along said preselected path as said irrigation system moves therealong without excessive deviation therefrom.

33. The irrigation system of claim 31 wherein said sensor means is located forward of the conduit a distance not so great that said control system is excessively sensitive in maintaining said irrigation system along said preselected path as said irrigation system moves therealong.

34. The irrigation system of claim 30 wherein said path defining means is a guide means extending above the ground and along the length of the field to be irrigated, and said sensor means are microswitches positioned to be selectively actuated by co-action with said guide means upon lateral displacement of said sensor means relative to said guide means.

35. The irrigation system of claim 30 wherein said tower drive means controlled in response to said sensor means are controlled such that the speed of the left end of said conduit is slower than the speed of the right end of said conduit when said sensor means is to the right of said path and the speed of the right end of said conduit is slower than the speed of the left end of said conduit when said sensor means is to the left of said path.

36. The irrigation system of claim 35 further comprising means in response to said sensor means to normally drive controlled towers near opposite ends of said conduit at approximately the same speed when the sensor means is on said path.

37. A linear move irrigation system for irrigating a field comprising a conduit extending over the field to be irrigated, said conduit supported above the ground by a series of support towers each having drive means associated therewith, the conduit having a series of liquid dispensers located along its length for dispensing liquid fed through the conduit to the field, a control system for controlling the movement of the irrigation system over the field, said control system further comprising means defining a preselected path along which the irrigation system is to move, sensor means at a location along said conduit, an arm extending forwardly of said conduit at a location along said conduit, said arm maintaining a fixed angle relative to said conduit, said sensor means being mounted to said arm at a location spaced forwardly of the conduit a sufficient distance to maintain said irrigation system on said preselected path as said irrigation system moves therealong without excessive deviation therefrom and a distance not so great that said control system is excessively sensitive in maintaining said irrigation system on said preselected path as said irrigation system moves therealong, said sensor means sensing its lateral displacement relative to said path, and means responsive to said sensor means for automatically controlling the drive means of towers near opposite ends of said conduit to maintain said sensor means on said path, said tower drive means controlled in response to said sensor means being controlled such that the speed of the left end of said conduit is slower than the right end when said sensor means is to the right of said path and the speed of the right end of said conduit is slower than the left end when said sensor means is to the left of said path, both ends of said conduit being made to move at approximately the same speed when the sensor means is on said path.

38. A linear move irrigation system for irrigating a field comprising a conduit for extending over the field to be irrigated, said conduit supported above the ground by a series of support towers each having drive means associated therewith, the conduit having a series of liquid dispensers located along its length for dispensing liquid fed through the conduit to the field, a control system for controlling the movement of the irrigation system over the field, said control system comprising means defining a preselected path along which the irrigation system is to move, an arm extending generally forwardly of the conduit relative to its direction of travel, sensor means for sensing a displacement of said arm indicative of a deviation of said irrigation system from said preselected path, and means responsive to said sensor means sensing such a displacement of said arm for automatically controlling the drive means of towers near opposite ends of said conduit for effecting a corrective movement of said irrigation system toward said path.

39. The irrigation system of claim 38 further comprising means in response to said sensor means to normally drive said controlled towers near opposite ends of said conduit at approximately the same speed when the irrigation system is on said path, and for changing the speed of at least one of said controlled towers relative to the other upon said sensor means sensing a predetermined displacement of said arm to bring said irrigation system back on said path.

* * * * *